April 13, 1948.    H. C. PRIEST    2,439,578
COUNTING MECHANISM
Filed April 2, 1946
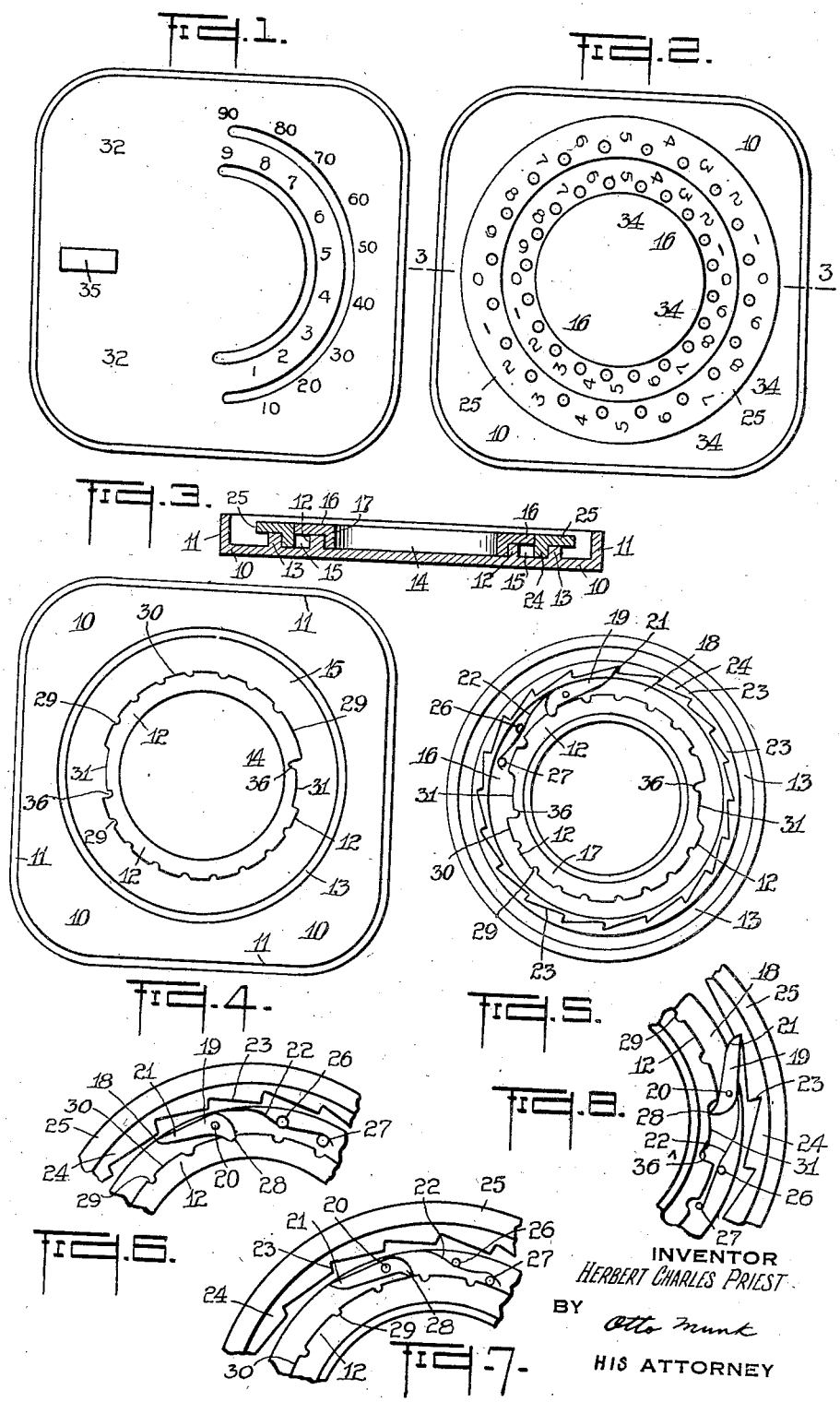

Patented Apr. 13, 1948

2,439,578

UNITED STATES PATENT OFFICE 2,439,578

COUNTING MECHANISM

Herbert Charles Priest, Bexley, near Sydney, New South Wales, Australia

Application April 2, 1946, Serial No. 659,058
In Australia May 2, 1945

3 Claims. (Cl. 235—78)

This invention has reference to counting mechanism, and has been devised primarily in order to provide mechanism of this description which will facilitate the keeping of a score in competitive games or the indicating amounts in monetary terms or otherwise.

An object of the invention is to provide counting mechanism which may be economically constructed in compact and comparatively flat form and wherein a minimum of parts is required to register units and multiple numbers such as tens and hundreds, or higher denominations if desired.

A further object of the invention is to provide compact counting mechanism which will allow of members representing the various denominations, being moved directly to advance the score as a game progresses, and to display it clearly for the benefit of the participants.

According to this invention, the members representing the various denominations are mounted concentrically about a central axis, the member representing the units being in the form of a disc or a ring, and the members representing the higher denominations being in the form of annular members surrounding the said disc or ring.

The aforesaid members are rotatable with respect to a base plate or frame whereon or wherein they are arranged to be actuated manually.

The several members may be rotated by means of a stylus inserted in holes therein adjacent to corresponding numbers marked on the respective members, but convenient studs, knobs, or the like may be used to effect rotation of the members.

In one form of the invention the base of the mechanism comprises a plate which has several concentric ribs extending upwards from its face, one in respect of each of the said members. These ribs serve as guides for the several rotatable members, the innermost one of which has a boss fitting into a central circular aperture in the aforesaid plate, the other rotatable members having concentric marginal ribs or annular bosses depending from their lower faces and adjacent to their inner edges. Alternatively, as hereinbefore suggested the innermost rotatable member may be in the form of a ring.

The inner faces of the ribs or bosses on the said other rotatable members have formed therein a series of equally spaced teeth or notches preferably of saw tooth shape which are designed to be engaged by a spring pawl pivoted on the adjacent rotatable member.

When the invention provides for three rotatable members representing units, tens and hundreds respectively, the innermost member and the intermediate one both have pawls for rotating the members encircling them. These pawls have their tails designed to engage a series of spaced notches in the outer periphery of the ribs on the base plate of the mechanism.

In order that the invention may be more readily understood, reference will now be made to the accompanying drawings wherein:

Figure 1 is a plan view of the invention with cover in position.

Figure 2 is a plan view thereof with cover removed and showing the rotatable members.

Figure 3 is a sectional elevation on line 3—3 of Figure 2.

Figure 4 is a plan view of the base plate showing the upwardly extending annular ribs, the cover and rotatable members having been removed.

Figure 5 is a skeleton view illustrating the operation of the device.

Figure 6 is a part underside plan view on an enlarged scale of the rotatable members showing the pawl in engagement with one of the retaining notches.

Figure 7 is a part underside view on an enlarged scale of the rotatable members showing the pawl in its disengaged position and the rotatable units member free to turn with respect to the tens member.

Figure 8 is a part underside view on an enlarged scale of the rotatable members showing the pawl actively engaged with the tens unit due to the tail of the pawl being received in the extended notch.

The base plate 10 has a flange 11 and is formed with annular projections 12 and 13, see Figures 3, 4, which produce a circular recess 14 and an annular channel 15.

A unit member 16 having two sets of numerals 0 to 9 on its upper face and having an annular boss 17 received in the said circular recess 14. Said units member 16 on its under face 18, Figures 6, 7 and 8, has a pawl 19 pivotally mounted upon a pin 20. The nose 21 of said pawl 19 is pressed by a spring 22 into engagement with ratchet teeth 23 formed upon an annular boss 24 which is part of a tens member 25, see Figures 5, 6, 7 and 8, similar to the units member 16.

The spring 22 may be a leaf spring as illustrated, secured between pins 26 and 27 carried by the said units member 16. The pawl 19 has a heel 28 which is capable of engaging notches 29 formed upon the outer periphery 30 of the annular projection 12. The said outer periphery 30 of the annular projection 12 also has two extended notches 31, and a small notch 36, Figures 4 and 8, the use of which will be explained later.

The base plate 10 is provided with a cover 32, Figure 1, having arcuate operating slots 33 through which a stylus may be inserted into orifices 34, see Figure 2, in the respective rotatable members 16 and 25. A window 35 is provided through which totals of additions may be viewed.

It will be appreciated that by the addition of further rotatable members, similar to the units member 16 and each having a pawl 19 and cooperating with appropriate scale slots 33, and notches 29 and extended notches 31, provision may be made for the addition of higher denominations such as hundreds and thousands.

In setting up the device the cypher 0 of the respective rotatable members 16 and 25 is positioned in line with the totals window 35 and in this position the numeral 6 will be found to coincide with the lowest position of the segmental operating slots 33 which have positions numbered 1 to 9 from bottom to top of the scale formed on the cover 32.

If a stylus is inserted in say No. 6 position of the units slot 33 to engage the units rotatable member 16 and the latter is turned clockwise thereby until the stylus engages the lowest part of the said slot 33 then the numeral 6 will appear at the totals window 35. During this movement of the units member 16, see Figures 6 and 7, the pawl 19 is held clear of the ratchet teeth 23 on the annular boss 24.

It will be observed that the proportioning and positioning of the pawl 19 and the notches 29 is such that when engagement of the heel 28 of the pawl 19, Figure 6, with the notch 29, takes place, the nose 21 of the pawl 19 is clear of the ratchet 23, but that the units member 16 is held against accidental displacement.

When the units member 16 has advanced in one or more stages from the "0" position to the "9" position the tail 28 of the pawl 19 enters the elongated notch 31 and drops into a notch 36, see Figures 4 and 8, and the pawl nose 21 engages a ratchet tooth 23. If now the units member 16 is moved further spaces by an addition of units to the total, the engagement of the pawl and ratchet advances the tens member one space or numeral, only, and the total is recorded in the total window. In moving from the elongated notch 31, the tail of the pawl mounts the projection 12 and withdraws the pawl from the ratchet, the process continuing for every additional ten.

It will be understood that the aforesaid construction will allow of two or more sets of the rotatable members being arranged upon a single base plate to constitute a score board with or without other indicating means, so that scores in respect of two or more parties in a competitive game may be conveniently displayed by the said board.

It will be appreciated that various modifications may be made without departing from the spirit of the invention as defined by the appended claims.

I claim:
1. Counting mechanism comprising a base plate having a plurality of concentric projecting ribs formed thereon, a cover disposed above the base plate, a plurality of rotatable members disposed between the cover and the base plate each cooperating with one of the said ribs by means of a ratchet pawl, said members being divided into spaces numbered 0 to 9, one of said rotatable members having a pivot, said pawl being mounted on the pivot for engagement with ratchet teeth formed on the adjacent rotatable member; means formed on the concentric projecting ribs for cooperating with the respective pawls whereby movement of the said one rotating member is imparted to the said adjacent rotating member for every ten of the numbered spaces moved relatively to a scale carried upon the said cover.

2. Counting mechanism comprising a base plate having a plurality of concentric projecting ribs formed thereon, a cover for the base plate, a plurality of rotatable members each cooperating with one of the said ribs, and divided into spaces numbered 0 to 9, a ratchet pawl pivotally mounted on one of the said rotatable members for engagement with ratchet teeth formed on the adjacent rotatable member, an extended notch formed on the concentric projecting ribs, said pawls having a heel for engaging the said extended notch, and a spring carried by the said rotating member and acting upon the rear of the said pawl whereby movement of the said one rotating member is imparted to the said adjacent rotating member for every ten of the numbered spaces moved relatively to a scale carried upon the said cover.

3. Counting mechanism comprising a base plate, having a plurality of concentric projecting ribs formed thereon, a cover for the base plate, a plurality of rotatable members each cooperating with one of the said ribs, and divided into spaces and numbered 0 to 9, a ratchet pawl pivotally mounted on one of the said rotatable members, and adapted to engage ratchet teeth formed on the adjacent rotatable member, an extended notch formed on the concentric projecting ribs, said pawls having a heel for engaging the said extended notch and a spring carried by the said rotating member and acting upon the rear of the said pawl whereby movement of one rotating member is imparted to the said adjacent rotating member for every ten of the numbered spaces moved relatively to a scale carried upon the said cover, said ribs each having a plurality of notches formed upon their outer periphery for engagement by the said heel of the respective pawls to prevent overrunning and relative movement between adjacent rotating members when the said members are not being rotated.

HERBERT CHARLES PRIEST.

REFERENCES CITED

The following references are of record in the file of this patent:

UNITED STATES PATENTS

| Number | Name | Date |
|---|---|---|
| 476,350 | Wright | June 7, 1892 |
| 695,217 | Lanckton | Mar. 11, 1902 |
| 1,243,224 | Rodolf | Oct. 16, 1917 |
| 1,314,897 | Paul | Sept. 2, 1919 |